(12) United States Patent
Hansen et al.

(10) Patent No.: US 9,531,767 B2
(45) Date of Patent: Dec. 27, 2016

(54) COLLABORATIVE CONTENT STREAMING

(71) Applicant: Motorola Mobility LLC, Libertyville, IL (US)

(72) Inventors: Mark D Hansen, Buffalo Grove, IL (US); Michael A Calendine, Lawrenceville, GA (US); Taneka L Frazier, Lilburn, GA (US); Grant H Lloyd, Lawrenceville, GA (US); Scott A Wilke, Durand, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 741 days.

(21) Appl. No.: 13/909,784

(22) Filed: Jun. 4, 2013

(65) Prior Publication Data

US 2014/0359151 A1 Dec. 4, 2014

(51) Int. Cl.
*G06F 15/16* (2006.01)
*H04L 29/06* (2006.01)

(52) U.S. Cl.
CPC ....... *H04L 65/4015* (2013.01); *H04L 65/1083* (2013.01)

(58) Field of Classification Search
USPC ............... 709/231, 205; 455/41.21; 370/259
See application file for complete search history.

(56) References Cited

U.S. PATENT DOCUMENTS

| 7,844,224 | B2 * | 11/2010 | Tian ....................... G06F 3/165 455/41.2 |
| 7,945,624 | B2 * | 5/2011 | Guccione ............ G06Q 10/109 709/205 |
| 8,295,766 | B2 * | 10/2012 | Zimbric .............. H04M 1/7253 455/41.2 |
| 2011/0164535 | A1 * | 7/2011 | Gillipalli ............. H04M 3/4288 370/259 |

FOREIGN PATENT DOCUMENTS

WO 2011043886 A1 4/2011

OTHER PUBLICATIONS

International Search Report and Written Opinion of international application No. PCT/US2014/039886, dated Aug. 21, 2014, 22 pgs.
"Simultaneous Use of HFP, A2DP, and AVRCP Profiles," Nov. 18, 2008, Retrieved from https://www.bluetooth.org/docman/handlers/DownloadDoc.ashx?doc id=49216, 46 pgs.
Wikipedia, "List of Bluetooth Profiles," Jun. 1, 2013, Retrieved from http://en.wikipedia.org/w/index.php?title=List_of_Bluetooth_profiles&oldid=557845648, 14 pgs.
International Preliminary Report on Patentability from counterpart International Application No. PCT/US2014/039886, mailed Dec. 17, 2015, 18 pp.

* cited by examiner

*Primary Examiner* — Tammy Nguyen
(74) *Attorney, Agent, or Firm* — Shumaker & Sieffert, P.A.

(57) ABSTRACT

This document describes techniques (300, 400, 500, 600) and apparatuses (100, 700) for collaborative content stream- (Continued)

ing. These techniques (300, 400, 500, 600) and apparatuses (100, 700) enable a receiver device (106) to stream content from multiple source devices (102) in a collaborative manner. In some embodiments, a receiver device (106) may establish multiple wireless connections with multiple respective source devices (102) from which streams of content are received.

17 Claims, 7 Drawing Sheets

COLLABORATIVE CONTENT STREAMING

BACKGROUND

Computing devices are often connected to a dedicated audio device to present content to multiple listeners or to increase an area over which the content is presented. A connection between a computing device and an audio device can be implemented via a wireless network, such as a wireless personal-area-network. Once a wireless connection is established with a computing device, the audio device can receive the content to be presented. Maintaining this wireless connection, however, often prevents the audio device from communicating with other computing devices or other content sources. Additionally, re-configuring the wireless connection or establishing another wireless connection with another computing device may be inconvenient, overly complex, or time consuming.

BRIEF DESCRIPTION OF THE DRAWINGS

Techniques and apparatuses for collaborative content streaming are described with reference to the following drawings. The same numbers are used throughout the drawings to reference like features and components.

DETAILED DESCRIPTION

Some audio devices can receive content from a computing device or other content source via a wireless network connection. Maintaining this wireless connection, however, often prevents an audio device from communicating with another source of content until the connection is reset or re-configured. Accordingly, sources of content from which the audio device receives content are limited by a wireless connection with a current content source. Resetting or re-configuring this wireless connection typically requires user interaction at the audio device and/or a next content source, which can be inconvenient, overly-complex, or time consuming. Additionally, resetting or re-configuring the wireless connection may disrupt or delay the presentation of audio content until a connection with the next content source is established.

This disclosure describes techniques and apparatuses for collaborative content streaming, which enable a content-receiver device (e.g., audio device) to establish and/or maintain multiple wireless connections with multiple respective content source devices. By so doing, users of the multiple respective content source devices may collaboratively stream respective content to the content-receiver device for presentation.

The following discussion first describes an operating environment, followed by techniques that may be employed in this environment, and ends with example apparatuses.

Operating Environment

Figure 1:
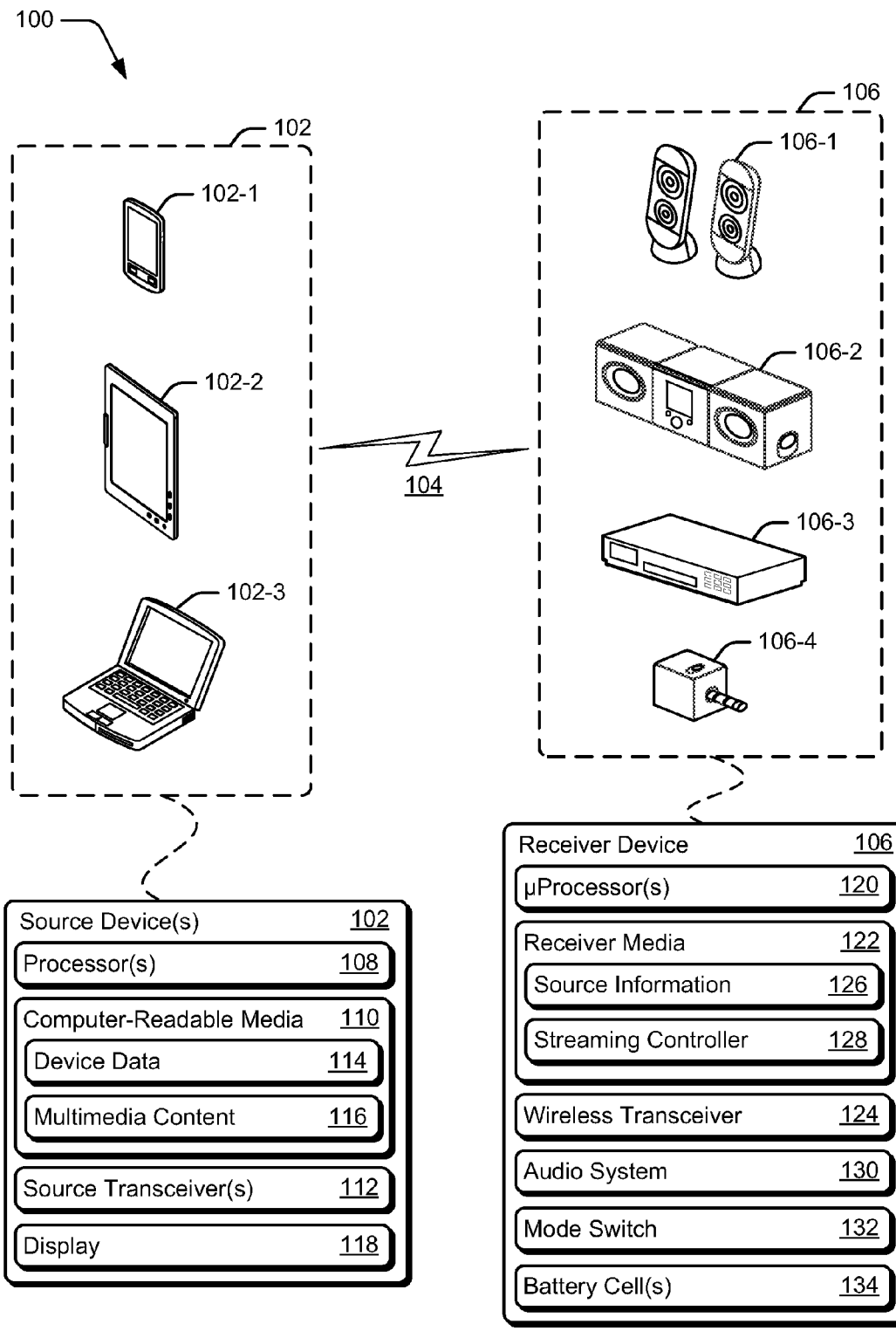
FIG. 1 illustrates an example environment in which techniques of collaborative content streaming can be implemented.

FIG. 1 illustrates an example environment 100 in which techniques for collaborative content streaming can be implemented. The example environment 100 includes content source device(s) 102 (source device(s) 102), a wireless communication medium 104, and a content-receiver device 106 (receiver device 106). The source devices 102 can be, or include, many different types of computing or electronic devices capable of streaming audio or video content. Three example source devices are shown, though others are contemplated. These example source devices include smart phone 102-1, tablet computer 102-2 (tablet 102-2), and laptop computer 102-3 (laptop 102-3). Other source devices may include, by way of example only, a cellular phone, notebook computer (e.g., netbook or ultrabook), personal media player, gaming console, desktop computer, video camera, or web-enabled content streaming device (e.g., set-top box).

Each source device 102 includes a processor(s) 108, computer-readable media 110, and source wireless transceiver(s) 112 (source transceiver(s) 112). Computer-readable media 110 (CRM 110) includes device data 114 and multimedia content 116, which may include any suitable video data, image data, audio data, or other multimedia data. Audio data of multimedia content 116 may be encoded in accordance with any suitable codec or coding, such as sub-band coding (SBC), MPEG-2 Audio Layer III (MP3), Advanced Audio Coding (AAC), or aptX™ coding. The device data 114 includes other data of a source device 102, such as firmware, operating system, applications, programs, or non-multimedia user data. The source transceiver(s) 112 may include any suitable type of wireless transceiver that enables a source device 102 to communicate via the wireless communication medium 104. For example, a source transceiver 112 that is configured as a Bluetooth™ transceiver communicates over the wireless medium 104 via a Bluetooth™ pico-net.

Alternately or additionally, a source device 102 may include other types of wireless transceivers, such as a near field communication (NFC) module, wireless local-area-network (WLAN) transceiver, or cellular radio. Although not shown, a source device 102 may also communicate via a wired communication interface, such as an Ethernet transceiver or universal serial bus (USB) port. A source device 102 may also include a display 118 that enables user interaction with content-related applications or graphical user-interfaces of the source device 102. In such cases, the display may be associated with, or include, a touch sensitive input device (e.g., touch-screen) through which user input is received.

A content-receiver device 106 (receiver device 106) can be one of many different types of devices capable of communicating with, and receiving content from, a source device 102. Four example receiver devices are shown, though others are contemplated. These example receiver devices include wireless speakers 106-1, a portable audio system 106-2 (e.g., portable stereo), an audio-video system receiver 106-3 (A/V receiver 106-3), and an auxiliary audio input device 106-4 (e.g., 3.5 mm audio dongle).

Each receiver device 106 includes micro-processor(s) 120 (µprocessor(s) 120), receiver device computer-readable media 122 (receiver media 122), and wireless transceiver 124. Receiver media 122 includes source device information 126 (source information 126) and streaming controller 128. Source information 126 includes data associated with one or more source devices 102 and/or data useful to communicate therewith. Streaming controller 128 is configured to enable a receiver device 106 to manage streams of content from one or more of the sources devices 102. In some cases, stream controller 128 enables a receiver device 106 to establish and/or maintain multiple wireless connections with multiple respective source devices 102. How source information 126 and stream controller 128 are implemented and used varies and is described below.

A wireless transceiver 124 may include any suitable type of wireless transceiver that enables a receiver device 106 to communicate via wireless communication medium 104. For example, wireless transceiver 124 may include a WLAN transceiver or a short-range wireless radio, such as a Bluetooth™ radio. In some cases, a receiver device 106 may include multiple wireless transceivers or a wired transceiver interface, such as a USB port or an Ethernet interface.

Each receiver device 106 may also include an audio system 130, mode switch 132, and/or battery cell(s) 134. An audio system 130 enables a receiver device 106 to present (e.g., playback) audio content received from a source device 102. The audio system 130 may include circuitry or components configured to perform digital-to-analog conversion, amplification, equalization, play control, and/or filtering of audio signals. Audio signals provided by the audio system 130 are transmitted to one or more speakers, which may be integrated with, or separate from, a receiver device 106. For example, auxiliary audio input device 106-4 may be plugged into an audio port of another audio device (e.g., non-network-enabled home theater system), enabling wirelessly streamed audio content to be presented via speakers of the other audio device.

Alternately or additionally, a receiver device 106 may include a video system (not shown) for processing a stream of video content. In some cases, the video system includes a display integrated with a receiver device 106, such as a liquid crystal display (LCD) or touch-sensitive GUI control panel. The mode switch 132 enables a user to select a content streaming mode of a receiver device 106. For example, a user may select, via the mode switch 132, a content streaming mode in which content is continuously streamed from a currently connected source device 102. Alternately, a user may select, via the mode switch 132, a content streaming mode in which content is collaboratively streamed from among multiple source devices 102. Alternately or additionally, functionalities provided by the mode switch 132 may be implemented by an application residing on a source device 102, with configurations or commands communicated via a wireless connection (e.g., wireless communication medium 104).

The battery cell(s) 134 provide power for a receiver device 106 when an external power source is not available or able to provide sufficient power. The battery cells 134 may be configured as a battery pack that is integrated with, or removable from, a receiver device 106. Alternately or additionally, a receiver device 106 may include power circuitry configured to regulate power received from the battery cells 134 or regulate charging power sent to the battery cells 134. In such cases, the receiver device 106 recharges the battery cells 134 when external power is available.

The wireless communication medium 104 (wireless medium 104) provides a wireless medium by which source device 102 and receiver device 106 may communicate. For example, a source transceiver 112 and a wireless transceiver 124 can communicate data via a connection of a wireless network implemented through wireless medium 104. Example wireless networks include a wireless wide-area networks (WWAN), wireless local-area network (WLAN) and wireless personal-area network (wireless PAN), each of which may be configured, in part or entirely, as infrastructure, ad-hoc, or mesh networks.

Figure 2:
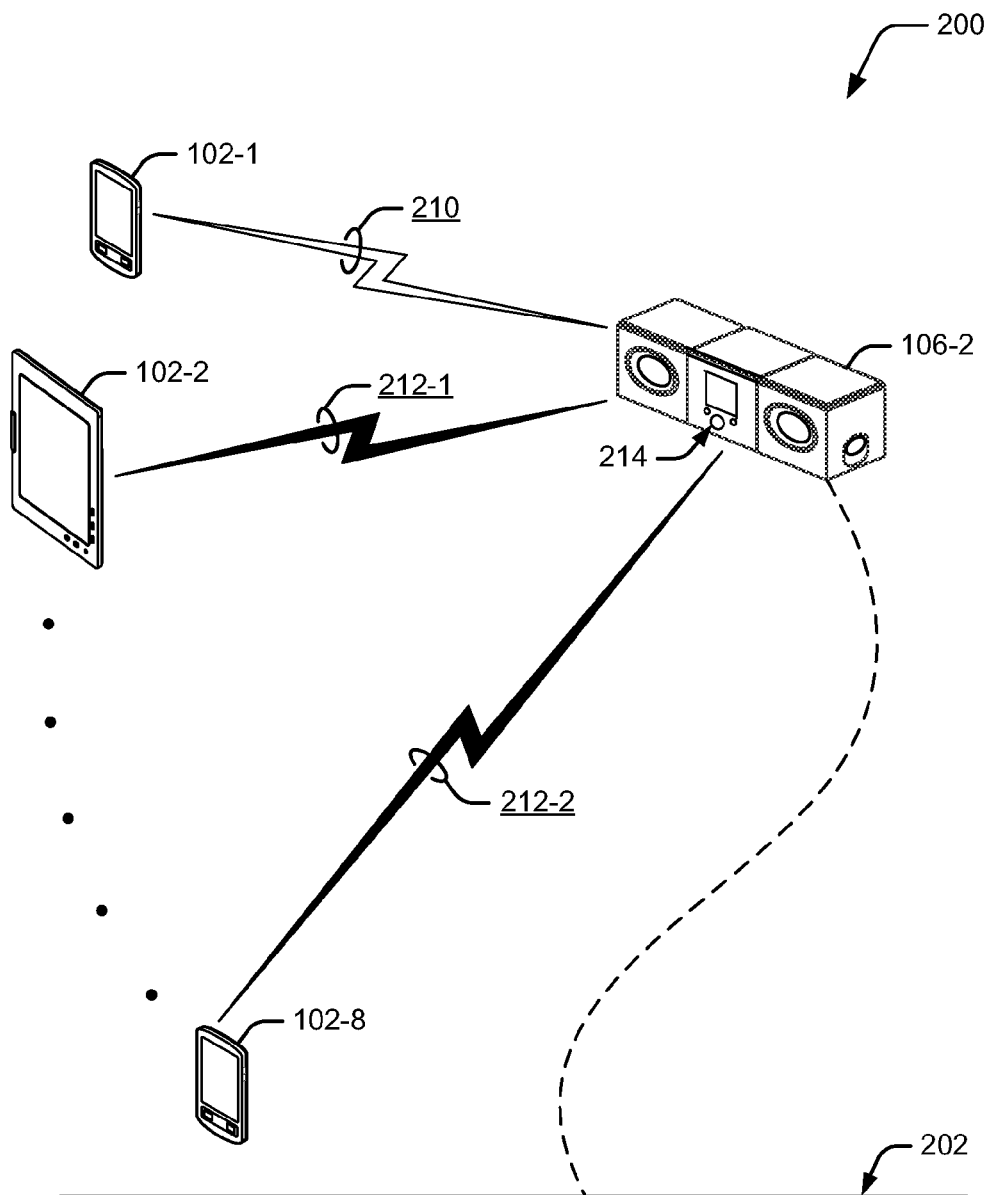
FIG. 2 illustrates an example wireless network implemented in accordance with one or more aspects of collaborative content streaming.

FIG. 2 illustrates an example wireless network implemented in accordance with one or more aspects of collaborative content streaming. In this particular example, a portable audio system 106-2 communicates with multiple source devices 102, three of which are shown for visual brevity. These source devices include smart phone 102-1, tablet 102-2, and another smart phone 102-8 (source devices 102-3 through 102-7 not shown). Here, the portable audio system 106-2 is configured to communicate over a wireless personal-area-network (PAN) in accordance with a Bluetooth™ protocol. The Bluetooth™ family of protocols support various communication profiles for communicating various types of data and/or enabling different feature sets between devices associated via a wireless PAN.

Communication profiles for audio or video distribution, such as the generic audio/video distribution profile (GAVDP) enable a device to communicate multimedia data with other devices. For example, a source device 102 can stream audio content to a receiver device 106 via the advanced audio distribution profile (A2DP). Alternately or additionally, a source device 102 can stream video content to a receiver device 106 via the video distribution profile (VDP). Other suitable profiles or communication protocols may also be used to stream content from a source device to a receiver device.

A source device 102 can control aspects of content-presentation, such as volume or play control (e.g., play, stop, fast-forward, rewind, track advance), at a receiver device 106 using the audio/video remote control profile (AVRCP). In some cases, metadata associated with streaming content is also transmitted to a receiver device 106 via AVRCP for use or storage at the receiver device. For example, a display-enabled receiver device 106 can display information or images associated with an artist, album, or track of content being presented. The stored metadata may also be useful to create or display playlists of content presented by a receiver device 106.

The AVRCP may also be used to filter content generated by, or streamed from, a source device 102. In some cases, a receiver device 106 can use an AVRCP command (e.g., GetPlayStatus function) to filter system sounds or alerts from audio content being streamed from the source device 102. In such cases, an active audio media player will return a 'playing' status, rather than a 'stopped' status, such as when system sounds or alerts are being generated by the source device 102. Alternately or additionally, an application residing on the source device 102 can distinguish or filter audio content streamed to a receiver device 106, preventing system sounds or alerts from being played by the receiver device 106.

A receiver device 106 associates or "pairs" with a source device 102 to open a connection over a communication profile. When devices pair, the devices exchange self-identifying information that is useful to configure a wireless connection between the devices. In some cases, self-identifying information is exchanged manually by entering personal identification numbers (PINs) at one, or both of, the devices. In other cases, exchanging self-identifying information can be automatic, automated, or proximity based. For example, a receiver device 106 may include a near-field communication (NFC) module or radio-frequency identification (RFID) tag that enables a source device 102 to automatically pair with the receiver device 106 when proximate (e.g., within 0.5 meters).

In the context of the present example, a portable audio system 106-2 pairs with a smart phone 102-1 via NFC communication when a user positions the smart phone 102-1 within a few inches of the portable audio system 106-2. The portable audio system 106-2 then stores self-identifying information associated with the smart phone 102-1 in a source information table 202 (e.g., a pairing table). The source information table 202 stores identification information associated with source devices 102, such as a play priority 204, medium access control (MAC) addresses, or device names 208.

As shown in FIG. 2, the source information table 202 can store information associated with up to eight unique source devices 102. Additional memory, however, can be allocated to the source information table 202 increasing a number source devices for which information can be stored. Source device information may be added to, or persist within, the source information table 202 until the table becomes full. Once full, an oldest entry of the source information table 202 is discarded to create space for source device information associated with a new source device.

When a receiver device 106 associates or pairs with a source device 102, the receiver device 106 creates a connection under a communication profile. In the context of the current example, the portable audio system 106-2 creates an A2DP connection 210 with the smart phone 102-1. By implementing techniques of collaborative content streaming, a receiver device 106 may establish and/or maintain connections with multiple source devices 102.

For example, prior to creating the A2DP connection 210, the streaming controller 128 of the portable audio system 106-2 may establish the suspended A2DP connections 212-1 and 212-2 with the tablet 102-2 and smart phone 102-8 respectively. To do so, the streaming controller 128 pairs with the smart phone 102-8 and opens an A2DP connection, which is subsequently suspended prior to pairing with another source device. The stream controller 128 can then pair, and open suspended A2DP connections with, other source devices 102 in range, such as the tablet 102-2. By so doing, the portable audio system 106-2 can stream audio content from the smart phone 102-1 while maintaining connections with other source devices 102. Additional or alternate aspects of collaborative content streaming vary and are described below.

Example Techniques

The following discussion describes techniques for collaborative content streaming, which in many cases enable a receiver device to collaboratively stream content from multiple source devices. These techniques can be implemented utilizing the previously described environment, such as the source information 126, stream controller 128, and/or wireless transceiver 124 of FIG. 1. These techniques include example methods illustrated in FIGS. 3-6, which are shown as operations performed by one or more entities. The orders in which operations of these methods are described are not intended to be construed as a limitation, and any number or combination of the described method operations can be combined in any order to implement a method, or an alternate method, including any of those illustrated by FIGS. 3-6.

Figure 3:
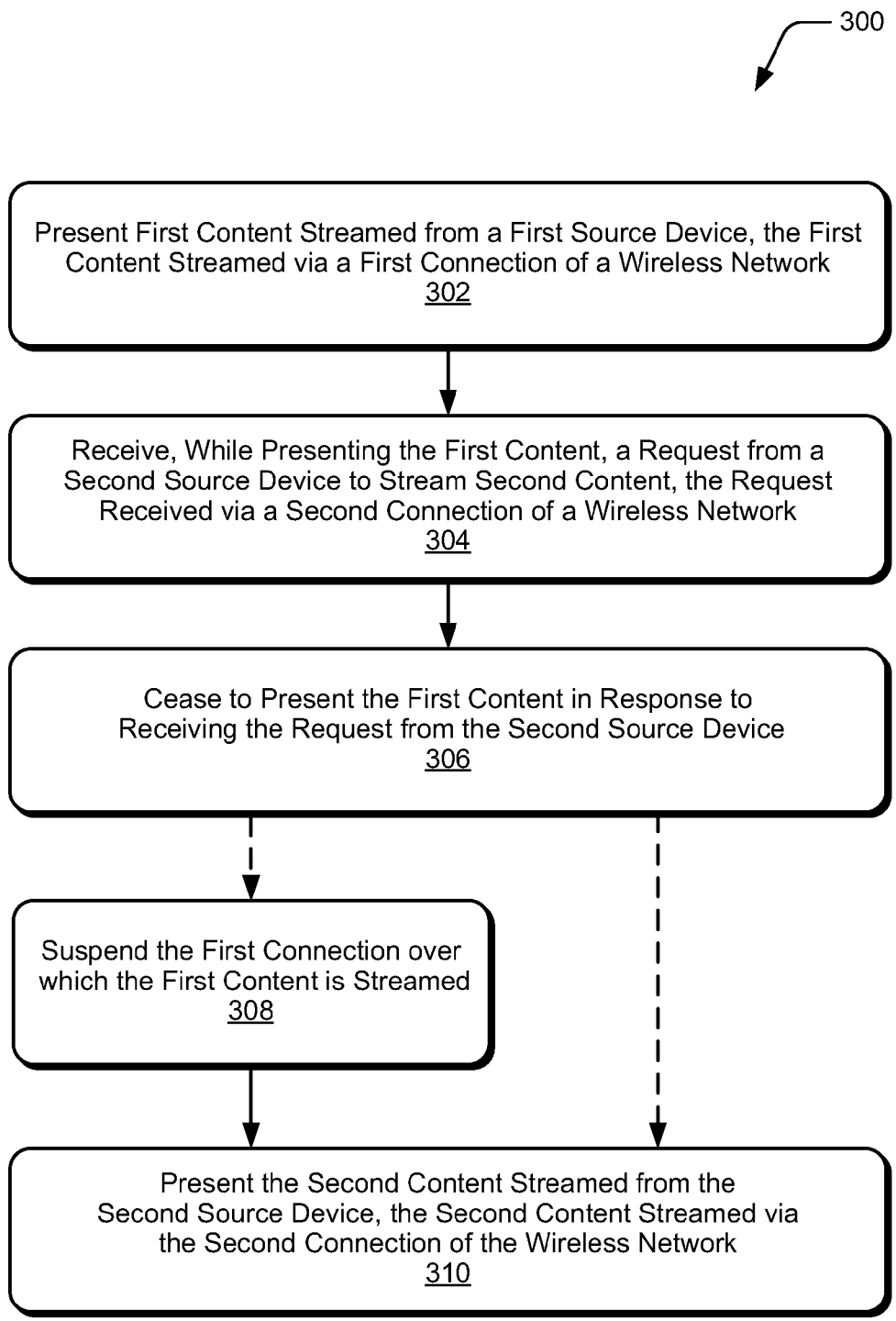
FIG. 3. illustrates example method(s) for collaborative content streaming performed at least in part by a content-receiver device.

FIG. 3 illustrates example method(s) 300 for collaborative content streaming performed at least in part by a content-receiver device.

At 302, first content streamed from a first source device is presented by a receiver device. The stream of the first content is received from the first source device via a first connection of a wireless network. This first wireless connection can be implemented using any suitable wireless network or protocol, such as a wireless personal-area-network or Bluetooth™ pico-net. Presenting the stream of the first content may include playing audio via one or more speakers. Alternately or additionally, video or other suitable multimedia content may be played back or displayed by a receiver device.

Consider an example in which content is streamed from a source device to receiver device for presentation. In the context of example wireless network 200, a portable audio system 106-2 plays a stream of audio data received from a smart phone 102-1 via an A2DP connection 210. The stream of audio content is played via speakers of the portable audio system 106-2, the volume of which can be controlled by an AVRCP connection. Also assume here that the portable audio system 106-2 has established suspended A2DP connections with other source devices, such as a tablet 102-2 and a smart phone 102-8. The stream controller 128 enables the portable audio system 106-2 to establish and/or maintain concurrent A2DP connections with multiple source devices.

At 304, a request to stream second content is received from a second source device. The request is received via a second connection of the wireless network and while the receiver device receives or presents the first content. The second wireless connection over which the second request is received may be inactive or in a suspended state prior to receiving the second request. In such cases, the second request may be an attempt by the second source device to activate the inactive or suspended wireless connection.

In the context of the present example, when a user initiates playback of audio content on tablet 102-2, a source transceiver (e.g., a Bluetooth™ radio) of the tablet 102-2 attempts to activate the suspended A2DP connection 212-1. The stream controller 128 of the portable audio system 106-2 detects this attempt to activate the suspended A2DP connection 212-1 as a request by the tablet 102-2 to initiate another stream of audio content.

At 306, presentation of the first content is ceased in response to receiving the request from the second source device. Ceasing to present the first content may also include notifying the first source device of which the content was being presented. Notifying the first source device may include suspending the first wireless connection over which the first stream of content was received. Suspending the first wireless connection enables this connection to be maintained with the first source device, and may preclude the need for a user to initiate a request to reconnect with the first source device at a later time.

Alternately or additionally, ceasing to present the first content may be gradual or mitigated, such as by reducing a volume at which audio content is played or cross-fading (e.g., over-lapping) playback of the first content with playback of subsequent content. In some cases, connections with both source devices may remain active for a short duration of time to enable sufficient audio content caching for cross-fading playback of the different audio content. In other cases, content of the first stream may be buffered and played on a short delay (e.g., 1 to 5 seconds). The content of the first stream can then be mixed with content of the second stream as the content of the second stream is received.

Optionally at 308, the first connection over which the first content is suspended. Suspending the first connection is effective to cause the first source device to cease streaming the first content. Alternately or additionally, a receiver device may transit an AVRCP command to the first source device causing the first source device to halt streaming or playback of content. A user of the first source device can then, at a later time, resume a stream of the first content from the point at which streaming is halted.

In this ongoing example, the stream controller 128 of the portable audio system 106-2 sends an AVRCP command to the smart phone 102-1. This AVRCP command halts the stream of audio content being streamed from the smart phone 102-1. The stream controller 128 then suspends the active A2DP connection 210 with the smart phone 102-1 effective to enable another suspended A2DP connection to be taken to an active state. Here, the portable audio system 106-2 gradually reduces a volume at which the audio content of the smart phone 102-1 is played initiating a crossfade into subsequent audio content.

At 310, second content streamed from the second source device is presented by the receiver device. The stream of the second content is received from the second source device via a second connection of a wireless network. Prior to receiving the stream of the second content, the second wireless connection may be activated from a suspended or inactive state. This second wireless connection can be implemented using any suitable wireless network or protocol, such as a wireless personal-area-network or Bluetooth™ pico-net.

Presenting the stream of the second content may include playing audio via one or more speakers. A volume at which the second content is presented may be gradually increased to minimize disruptions when transitioning between streams of content. Alternately or additionally, video or other suitable multimedia content may be played back or displayed by the receiver device. Further, the receiver device may resume presenting first content streamed from the first source device responsive to the second source device ceasing to stream the second content.

Concluding the present example, the stream controller 128 of the portable audio system 106-2 activates the suspended A2DP connection 212-1 with the tablet 102-2. The portable audio system 106-2 then plays a stream of audio data received from the tablet 102-2 via the now-active A2DP connection 212-1. The stream of the audio content is played via speakers of the portable audio system 106-2, the volume of which can be controlled by an AVRCP connection. Here, the portable audio system 106-2 gradually increases a volume at which the audio content of the tablet 102-2 is played to complete the crossfade from the previously played audio content.

Figure 4:
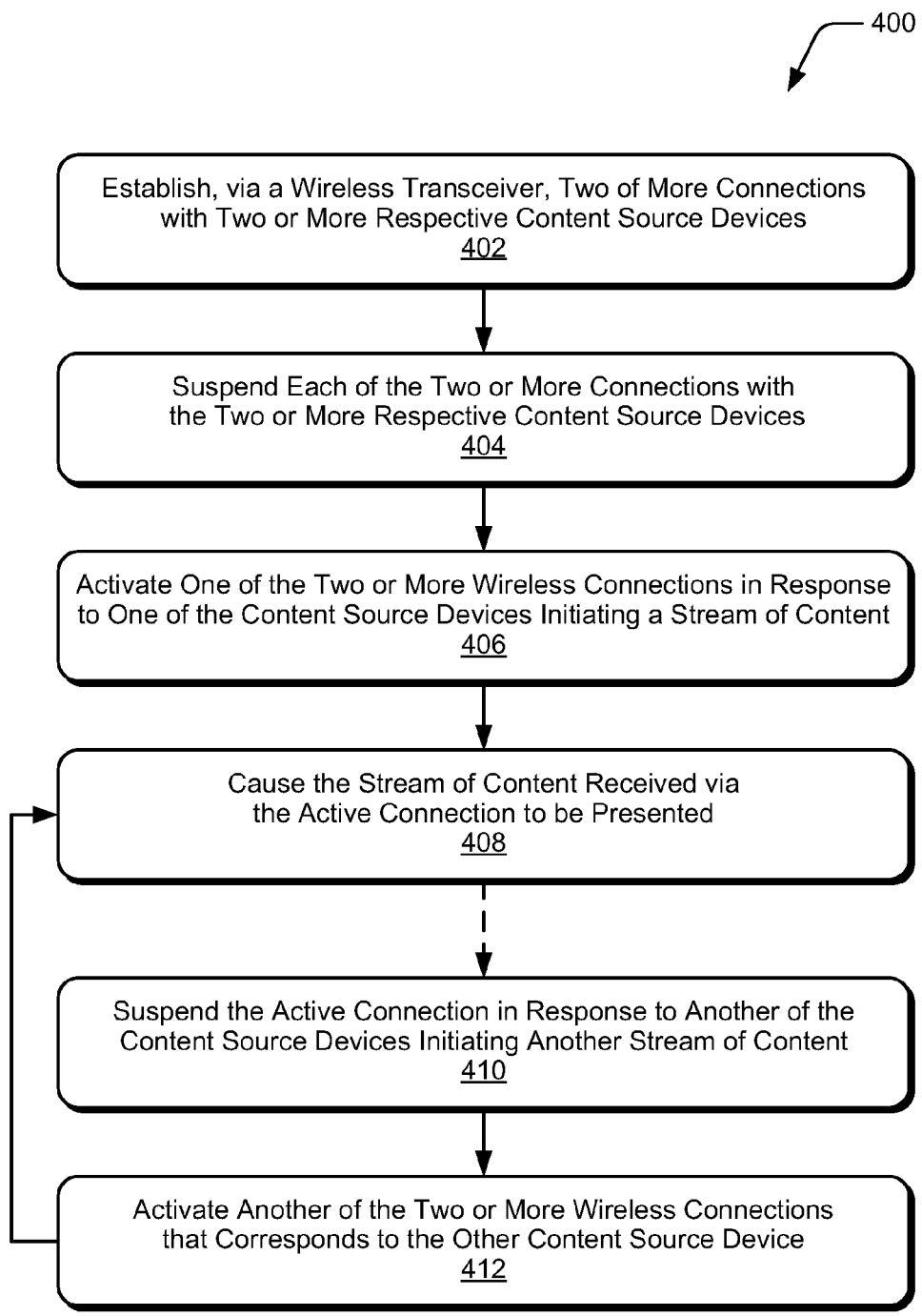
FIG. 4. illustrates other example method(s) for collaborative content streaming performed at least in part by a content-receiver device.

FIG. 4 illustrates other example method(s) 400 for collaborative content streaming performed at least in part by a receiver device.

At 402, multiple connections with multiple respective source devices are established via a wireless transceiver. The wireless transceiver is associated with a receiver device capable of presenting content or causing content to be presented. In some cases, each of the multiple connections is an instance of a connection using a communication profile, such as an A2DP connection or a VDP connection. A receiver device may also store information associated with each of the source devices, such as by writing the information to a source information table. This information is useful to establish or maintain connections with the multiple source devices.

Consider another example in which a receiver device establishes connections with multiple source devices. In the context of example environment 100, an auxiliary audio input device 106-4 (aux. input device 106-4) establishes multiple respective connections with a smart phone 102-1, tablet 102-2, and laptop 102 3. Here, the stream controller 128 enables a wireless transceiver 124 of the aux. input device 106-4 to establish and maintain concurrent A2DP connections with the multiple source devices. As the connections are established, the stream controller 128 stores information associated with the respective source devices to a source information table 202. Also assume here that the aux. input device 106-4 is plugged into an input port of an audio system that lacks wireless communicative capability, which is effective to enable the audio system to play content streamed to the aux. input device 106-4.

At 404, each of the multiple connections with the multiple respective source devices is suspended. Each of the multiple connections may be suspended subsequent to being established. In some cases, a previously established connection is suspended prior to establishing a next connection with another source device. By so doing, the receiver device is able to maintain multiple concurrent connections with multiple source devices. Alternately or additionally, a last-made connection may remain active until a next source device is detected or another of the source devices initiates a stream of content.

In the context of the present example, the stream controller 128 of the aux. input device 106-4 suspends each of the A2DP connections with the smart phone 102-1, tablet 102-2, and laptop 102-3. In this particular example, the stream controller 128 suspends each of the A2DP connections prior to a subsequent connection being established. By so doing, the aux. input device 106-4 is able to maintain multiple A2DP connections with the multiple respective source devices.

At 406, a connection with one of the multiple source devices is activated in response to the source device initiating a stream of content. The source device may initiate a stream of content by attempting to activate a suspended connection. A receiver device may detect this attempt to activate the suspended connection and activate the suspended connection to which the source device corresponds. Alternately or additionally, a display or light-emitting diodes (LEDs) of the receiver device may indicate which of the multiple source devices controls the active connection.

Activating the suspended connection enables the receiver device to receive a stream of content over the active connection. In some cases, attempting to activate the suspended connection is responsive to a user initiating playback of content at a source device. In such cases, a receiver device may determine whether the audio activity of the source device is playback of audio content or a system event or alert (e.g., undesired audio). The receiver device may ignore the audio activity of the source device responsive to determining that the audio activity is a system event or alert of the source device.

Continuing the ongoing example, assume that a user of the smart phone 102-1 opens a multimedia application and begins playing musical content. Here, a source transceiver 112 of the smart phone 102-1 attempts to activate the suspended A2DP connection with the aux. input device 106-4. The stream controller 128 of the aux. input device 106-4 then takes the A2DP connection active enabling the aux. input device 106-4 to communicate with the smart phone 102-1.

At 408, the stream of content received via the active connection is caused to be presented. The stream of content is presented through any suitable content-presentation interface, such as a monitor, display, local speakers, stereo system, and/or remote speakers. In some cases, the receiver device plays audio content via internal or integrated speakers. In other cases, a receiver device causes the presentation of audio content by providing audio signals to an external audio system configured to play audio content. The audio signals may be transmitted to the external audio system via a wired or wireless interface (e.g., frequency modulation (FM) modulator).

In the context of the present example, the aux. input device 106-4 receives the stream of musical content from the smart phone 102-2. The audio system 130 of the aux. input device 106-4 then converts the stream of musical content to audio signals. These audio signals are then transmitted to the audio system into which the aux. input device 106-4 is plugged for playback. The audio system plays the musical content of the smart phone 102-2 that is streamed to the aux. input device 106-4. From the perspective of the audio system, the aux. input device 106-4 appears as a hard-wired remote source of audio content. Volume or other playback characteristics of the audio content played through the audio system are controlled via the smart phone 102-2 using an AVRCP connection.

Optionally at 410, the active connection is suspended in response to another of the multiple source devices initiating another stream of content. Suspending the active connection is effective to cause the corresponding source device to stop streaming content to the receiver device. The other source device initiates a stream of content by attempting to activate another suspended connection while the receiver device streams content over the active connection. In some cases, the other suspended connection is activated responsive to another user initiating playback of other content at another source device.

Continuing the ongoing example, assume that a user of laptop 102-3 begins playing musical content via a web-based music station. Here, a source transceiver 112 of the laptop 102-3 attempts to activate the suspended A2DP connection with the aux. input device 106-4. The stream controller 128 of the aux. input device 106-4 detects this attempt to activate the suspended A2DP connection corresponding to laptop 102-3. The stream controller 128 then, responsive to detecting the attempt to activate another connection, suspends the active A2DP connection with the smart phone 102-1.

At 412, another of the multiple connections that corresponds to the other source device is activated. Activating the other connection enables the receiver device to receive a stream of content from the other source device. Disruptions resulting from transitioning between streams of content can be minimized by crossfading from one stream of content to another. From operation 412, method 400 may return to operation 408, at which point a stream of content received from the active connection is presented.

Concluding the present example, the stream controller 128 of the aux. input device 106-4 takes the A2DP connection with the laptop 102-3 active. This enables the aux. input device 106-4 to receive the other stream of musical content from the laptop 102-3. Note that the stream of musical content is received by the aux. input device 106-4 from laptop 102-3, and not directly from the web-based music station accessed by the laptop 102-3. The audio system 130 of the aux. input device 106-4 then converts the other stream of musical content to audio signals for transmission to the audio system. Once the audio system receives the audio signals, the audio system plays the other musical content via one or more speakers.

As described above, volume or other playback characteristics of the audio content played through the audio system can be controlled via the laptop 102-3 using an AVRCP connection. Here, the aux. input device 106-4 the continues to present the other musical content of the laptop 102-3 until another source device initiates yet another stream of content or the laptop 102-3 ceases to stream content. If the laptop 102-3 ceases to stream content, the aux. input device 106-4 can attempt to resume the stream content received from smart phone 102-1. Alternately, a user may use a mode switch of the aux. input device 106-4 to disable collaborative content streaming. This is effective to cause the aux. input device 106-4 to continue to stream content from the laptop 102-3 regardless of other activity of the other source devices.

Figure 5:
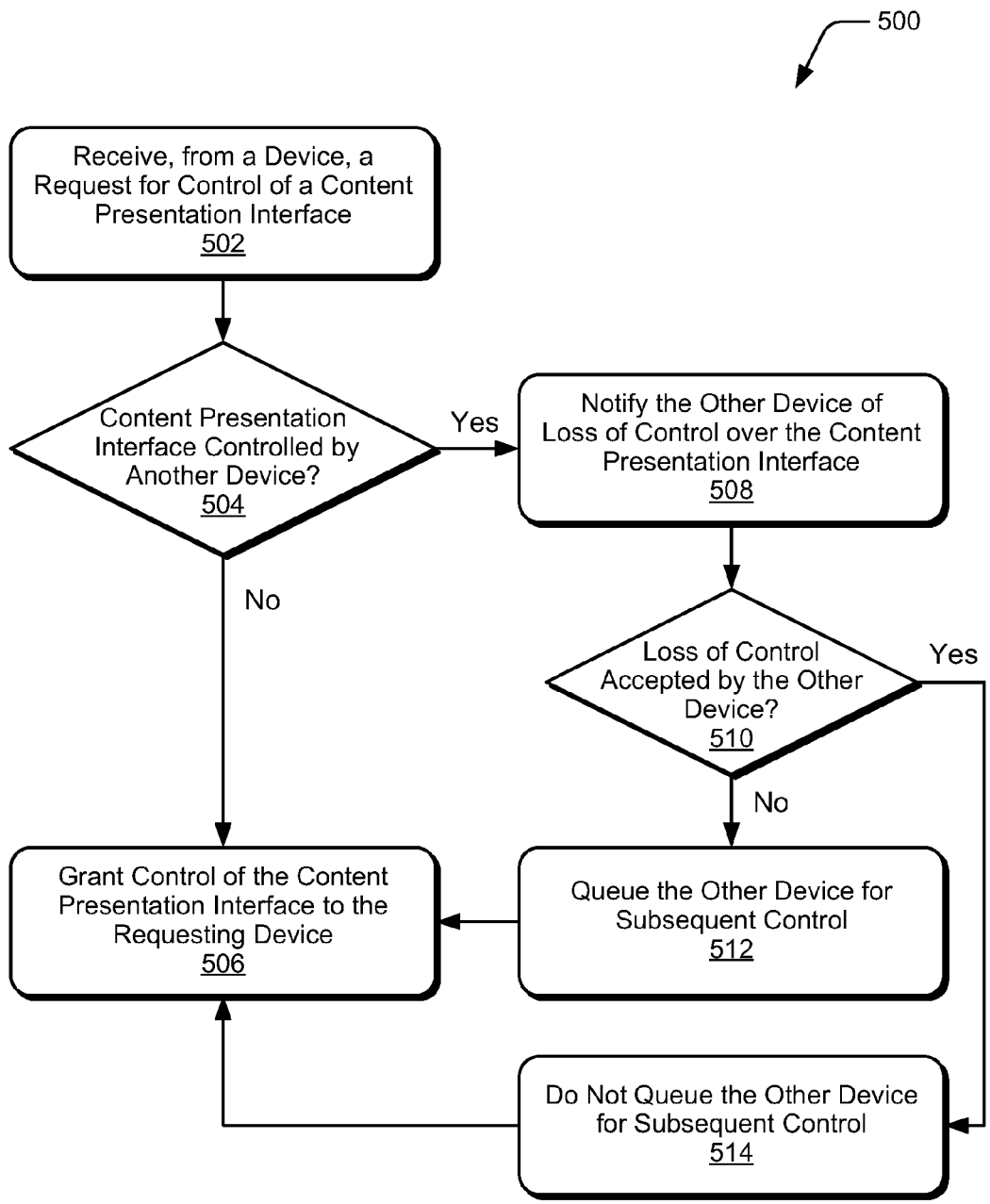
FIG. 5 illustrates example method(s) for managing control of a content-presentation interface.

FIG. 5 illustrates an example method 500 for managing control of a content-presentation interface.

At 502, a request for control of a content-presentation interface is received from a device. The content-presentation interface may include speakers or a display of a receiver device, such as a wireless boombox or wireless speakers. The request is received from a source device, from which audio or video content is streamed via a connection of a wireless network. In some cases, the request is the source device attempting to activate a wireless connection with the receiver device.

At 504, it is determined whether the content-presentation interface is controlled by another device. In some cases, the other device is controlling to content-presentation interface of the receiver device. In such cases, content streaming from the other device may be presented by the content-presentation interface. In other cases, the content-presentation interface may not be controlled by another device and may reside in an idle state. From operation 504, a "No" path proceeds to operation 506 responsive to determining that another device does not control the content-presentation interface, or a "Yes" path proceeds to operation 508 responsive to determining that another device does control the content-presentation interface.

At 506, the request for control of the content-presentation interface is granted to the requesting device. Granting control of the content-presentation interface enables the requesting device to stream content. This may include activating a suspended connection, such as a Bluetooth™ A2DP connection. Alternately or additionally, an acknowledgement may be transmitted to the source device, such as an AVRCP command. Content streamed from the requesting device is the presented via the content-presentation interface. In some cases, audio content is presented by playing audio content through speakers. In other cases, video content is presented by displaying video content on a display or monitor.

At 508, the other device is notified of loss of control over the content-presentation interface. Notifying the other device of loss of control may be effective to cause the other device to cease to stream content to the content-presentation interface. In some cases, the notification is indicated to the other device by suspending a wireless connection with the other device or through a command, such as an AVRCP command.

At 510, it is determined whether the other device accepted the loss of control over the content-presentation interface. In some cases, the other device may not acknowledge or accept the loss of control over the content-presentation interface. In other cases, the other device may acknowledge or accept the loss of control over the content-presentation interfaces. From operation 510, a "No" path proceeds to operation 512 responsive to the other device refusing to accept the loss of control over the content-presentation interface, or a "Yes" path proceeds to operation 514 responsive to the other device accepting the loss of control over the content-presentation interface.

At 512, the other device is queued for subsequent control of the content-presentation interface. Queuing the other device may include placing the other device in a next available position in a list of queued devices. For example, moving the other device from a first priority position of source information table 202 to a second priority position is effective to cause a receiver device to revert back to the other device when a current device cedes control. Once queuing is complete, method 500 proceeds to operation 506, at which point the request of the requesting device is granted as described above.

At 514, the other device is not queued for subsequent control of the content-presentation interface. The other device may be queued in a last priority position of a list of queued devices or dropped from the list of queued devices. For example, the other device can be moved to the eighth position of the source information table 202 or dropped from the source information table 202 if the other positions are held by additional source devices. Once disposition of the other device is complete, method 500 proceeds to operation 506, at which point the request of the requesting device is granted as described above.

Figure 6:
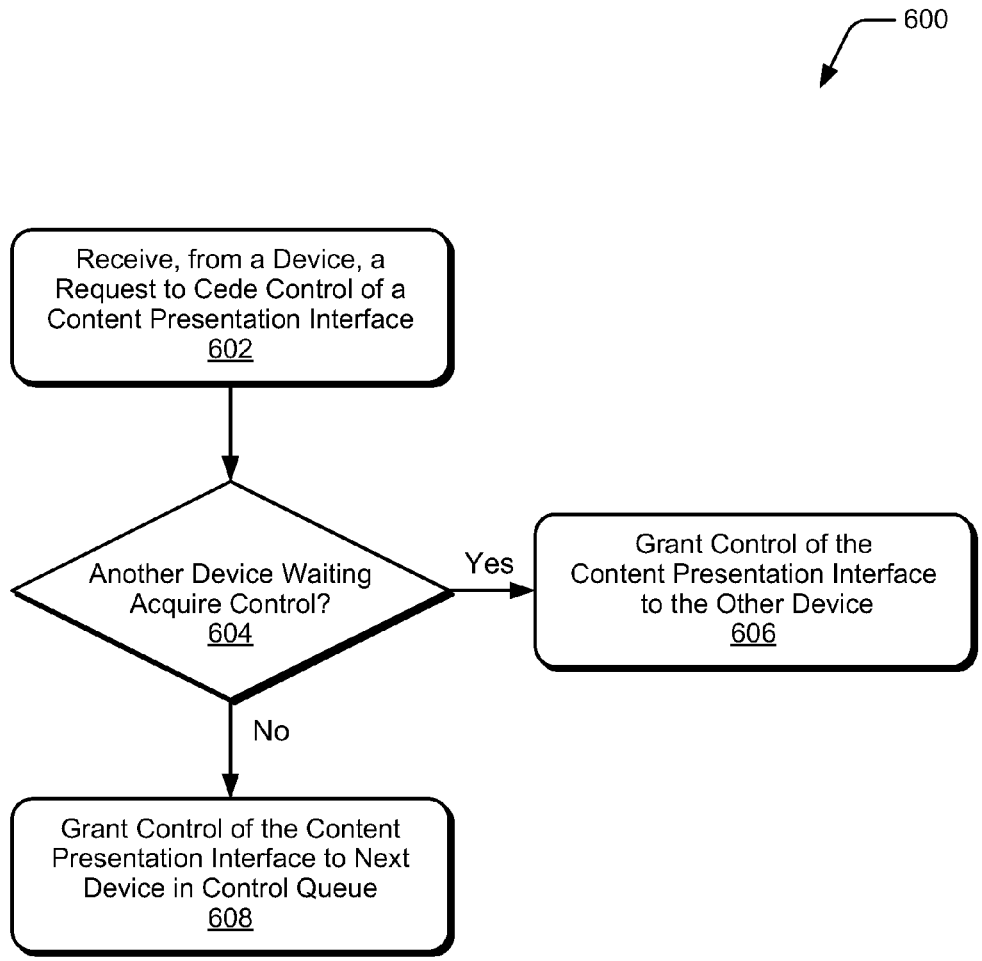
FIG. 6 illustrates another example method for managing control of a content-presentation interface.

FIG. 6 illustrates another example method 600 for managing control of a content-presentation interface.

At 602, a request to cede control of a content-presentation is received from a device. The request is received at a receiver device to which the device streams content for presentation via the content-presentation interface. The receiver device receives the request and the stream of content via a connection of a wireless network. The request to cede control may be indicated by the device by suspending the connection or ceasing to stream content.

At 604, it is determined whether another device is waiting to acquire control of the content-presentation interface. In some cases, the other device is queued to acquire control of the content-presentation interface. In other cases, the other device previously controlled the content-presentation interface and is waiting to re-acquire control thereof. From operation 604, a "Yes" path proceeds to operation 606 responsive to the other device waiting to acquire control of the content-presentation interface, or a "No" path proceeds to operation 514 responsive to there being no other device waiting for control of the content-presentation interface.

At 606, control of the content-presentation interface is granted to the other device. Granting control to the other device is effective to enable the other device to stream content for presentation via the content-presentation interface. In some cases, the other device previously controlled the content-presentation interface. In such cases, the other device may resume a previous stream of content that was paused when the other device lost control of the content-presentation interface. Alternately or additionally, presentation of the stream of content may be crossfaded with presentation of a previous stream of content to minimize a disruption when transitioning between the streams of content.

At 608, control of the content-presentation interface is granted to a next device in a control queue. Granting control to the next device in the queue is effective to enable the next device to stream content for presentation via the content-presentation interface. Alternately or additionally, presentation of the stream of content may be crossfaded with presentation of a previous stream of content to minimize a disruption when transitioning between the streams of content.

Example Receiver Device

Figure 7:
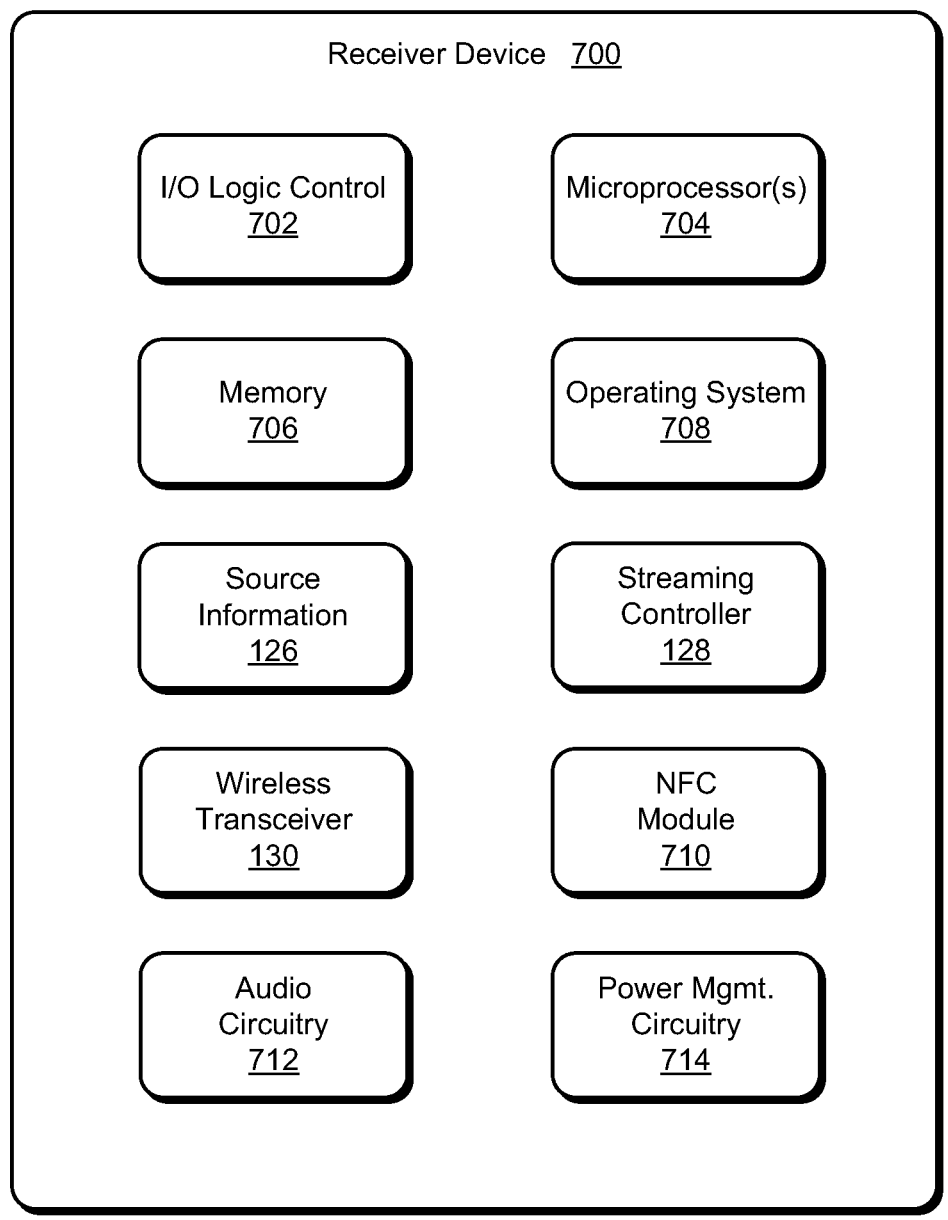
FIG. 7 illustrates various components of an example content-receiver device that can implement techniques of collaborative content streaming.

FIG. 7 illustrates various components of an example receiver device 700, which is implemented in hardware, firmware, and/or software, or as described with reference to any of the previous FIGS. 1-6 to implement collaborative content streaming.

The example peripheral 700 can be implemented in a fixed or mobile device being one or a combination of a media device, computer device, television set-top box, video processing and/or rendering device, appliance device (e.g., a closed-and-sealed computing resource, such as some digital video recorders or global-positioning-satellite devices), audio system receiver, portable audio system, speaker-equipped media player, auxiliary audio input device, gaming device, electronic device, vehicle, workstation, wireless peer device/client station, and/or in any other type of device that may communicate audio data or video data through a wired or wireless communication medium with a source device. Examples of some of these are shown in FIG. 1 at 106.

The example receiver device 700 can be integrated with electronic circuitry, a microprocessor, memory, input-output (I/O) logic control, communication interfaces and components, wireless transceiver, other hardware, firmware, and/or software needed to run an entire device. The example receiver device 700 can also include an integrated data bus or crossbar (not shown) that couples the various components of the receiver device for data communication between the components.

The example receiver device 700 includes various components such as an input-output (I/O) logic control 702 (e.g., to include electronic circuitry) and a microprocessor 704 (e.g., any of a microcontroller or digital signal processor). The example receiver device 700 also includes a memory 706, which can be any type of random access memory (RAM), a low-latency nonvolatile memory (e.g., flash memory), read only memory (ROM), and/or other suitable electronic data storage device or media. The example receiver device 700 can also include various firmware, code, and/or software, such as an operating system 708, which can be processor-executable instructions maintained by the memory 706 and executed by the microprocessor 704.

The example receiver device 700 includes source information 126, a streaming controller 128, and a wireless transceiver 130. Examples of these components and their functions are described with reference to the respective components as shown in FIGS. 1 and/or 2. Alternately or additionally, any of these components may be used to implement, in whole or part, techniques of collaborative content streaming as described with reference to the operations shown in FIGS. 3, 4, 5, and/or 6.

The example receiver device 700 may also include an NFC module 710, audio circuitry 712, and power management circuitry 714 (power mgmt. circuitry 714). The NFC module 710 enables the example receiver device 700 to communicate with other devices via near-field communication, such as when pairing a receiver device 106. The example receiver device 700 can also include other various communication interfaces and components, wireless LAN (WLAN) or PAN (WPAN) components, other hardware, firmware, and/or software.

The audio circuitry 712 is capable of providing any or all functionalities of audio system 132 as described above. For example, the audio circuitry 712 may perform digital-to-analog audio processing of streamed content and/or provide audio signal signals suitable for transmission to an amplifier or speaker system. The power management circuitry 714 is configured to regulate power received from batteries (rechargeable or non-rechargeable) or another external power source. Alternately or additionally, the power management circuitry 714 may regulate charging power sent to rechargeable batteries or a rechargeable battery pack.

The streaming controller 128 in the example receiver device 700, either independently or in combination with other entities, can be implemented as computer-executable instructions maintained by the memory 706 and executed by the microprocessor 704 to implement various embodiments and/or features described herein. The streaming controller 128 may also be provided integral with other entities of the receiver device, such as integrated with the wireless transceiver 130 and/or the audio circuitry 710. Alternatively or additionally, the streaming controller 128 and the other components can be implemented as hardware, firmware, fixed logic circuitry, or any combination thereof that is implemented in connection with the I/O logic control 702 and/or other signal processing and control circuits of the example receiver device 700.

Although various embodiments of an invention herein have been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    presenting, by a receiver device, first content streamed from a first device, the first content streamed via a first connection of a wireless personal area network;
    while presenting the first content, receiving, by the receiver device and from a second device, a request to present second content, the request received via a second connection of the wireless personal area network, wherein the first connection and the second connection are respective instances of an advanced audio distribution profile connection of the wireless personal area network;
    responsive to receiving the request from the second device, ceasing, by the receiver device, to present the first content streamed from the first device; and
    presenting, by the receiver device, the second content streamed from the second device via the second connection of the wireless personal area network.

2. The method of claim 1, further comprising, prior to presenting the second content, suspending the first connection of the wireless personal area network over which the first content is streamed from the first device.

3. The method of claim 1, wherein the second connection of the wireless personal area network is suspended in response to receiving the request from the second device, the method further comprising:
    prior to presenting the second content, activating the second connection of the wireless personal area network.

4. The method as recited in claim 1, wherein the first or the second content is audio content and presenting the audio content includes outputting the audio content over one or more speakers.

5. The method as recited in claim 4, wherein the audio content is encoded using low Complexity sub-band coding (SBC), MPEG-2 Audio Layer III (MP3) coding, advanced audio coding (AAC), or apt-x coding.

6. The method as recited in claim 1, wherein the respective instances of the advanced audio distribution profile connections with the first device and the second device are concurrently maintained.

7. The method as recited in claim 1 further comprising: responsive to the second device ceasing to stream the second content, resuming presentation of the first content streamed from the first device.

8. A method comprising:
    establishing, via a wireless transceiver of a device, a respective connection with each of two or more content source devices, wherein each of the respective connections is a respective instance of an advanced audio distribution profile connection of a wireless personal area network;
    suspending, by the device, each of the two or more connections with the two or more respective content source devices;
    activating, responsive to one of the content source devices initiating a stream of content, a particular one of the respective connections that corresponds to the content source device initiating the stream of content; and
    outputting, by the device, the stream of content received via the activated connection.

9. The method as recited in claim 8, wherein suspending each of the two or more connections is effective to enable the wireless transceiver to maintain two or more concurrent instances of the two or more connections.

10. The method as recited in claim 8, further comprising:
    suspending the activated connection responsive to another of the two or more content source devices initiating another stream of content;
    activating the respective connection that corresponds to the other content source device; and
    outputting, by the device, the other stream of content received via the respective connection that corresponds to the other content source device.

11. The method as recited in claim 8, wherein the stream of content is audio content or video content.

12. The method as recited in claim 11, wherein outputting the stream of content includes outputting the stream of audio content via one or more speakers or outputting the stream of video content via a monitor.

13. An apparatus comprising:
    transceiver circuitry configured to enable communication via a wireless personal area network;
    a processor; and
    a memory storing processor-executable instructions that, responsive to execution by the processor, implement a stream controller to:
        establish, via the transceiver circuitry, a respective wireless personal area connection with each content source device from a plurality of content source devices, wherein each of the respective connections is a respective instance of an advanced audio distribution profile connection of a wireless personal area network;
        receive, via one of the respective wireless connections and from a corresponding one of the plurality of content source devices, a request to stream content to a content presentation interface associated with the apparatus;

responsive to receiving the request, determine whether another one of the plurality of content source devices is streaming other content to the content presentation interface; and responsive to determining that the other one of the plurality of content source devices is not streaming the other content to the content presentation interface, grant the request of the content source device from which the request is received; and responsive to determining that the other one of the plurality of content source devices is streaming the other content to the content presentation interface:
cause the other content source device to cease streaming the other content to the content presentation interface; and
grant the request of the content source device from which the request is received after causing the other content source to cease streaming the other content.

14. The apparatus as recited in claim 13, further comprising:

input logic configured to receive user input,
wherein the stream controller is further implemented to select, based on the user input, as a source of streamed content a dedicated one of the multiple content source devices or any of the plurality of content source devices from which a request is received.

15. The apparatus as recited in claim 13, wherein at least one of the plurality of content source devices is configured as a smart-phone, mobile phone, personal media player, laptop computer, or web-enabled content streaming device.

16. The apparatus as recited in claim 13, further comprising:
one or more battery cells configured to provide power to the apparatus.

17. The apparatus as recited in claim 13, wherein the apparatus is embodied in whole or part as a wireless transceiver module, audio system receiver, portable speaker system, speaker-equipped media player, or auxiliary audio input device.

* * * * *